US012802917B2

(12) United States Patent
Bierwirth

(10) Patent No.: US 12,802,917 B2
(45) Date of Patent: Nov. 17, 2026

(54) FUSE COMPONENT WITH ELECTRONIC CIRCUIT BREAKER AND FUSE WIRE

(71) Applicant: Bayerische Motoren Werke Aktiengesellschaft, Munich (DE)

(72) Inventor: Florian Bierwirth, Steinhoering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 265 days.

(21) Appl. No.: 18/710,997

(22) PCT Filed: Nov. 10, 2022

(86) PCT No.: PCT/EP2022/081480
§ 371 (c)(1),
(2) Date: May 16, 2024

(87) PCT Pub. No.: WO2023/104422
PCT Pub. Date: Jun. 15, 2023

(65) Prior Publication Data

US 2025/0054719 A1 Feb. 13, 2025

(30) Foreign Application Priority Data

Dec. 9, 2021 (DE) ..................... 10 2021 132 463.7

(51) Int. Cl.
*H01H 85/02* (2006.01)
*H02H 3/04* (2006.01)
(Continued)

(52) U.S. Cl.
CPC ........ *H01H 85/0241* (2013.01); *H02H 3/044* (2013.01); *H02H 3/05* (2013.01);
(Continued)

(58) Field of Classification Search
CPC ....... H01H 85/0241; H01H 2085/0266; H01H 2085/0283; H01H 85/046; H02H 3/044;
(Continued)

(56) References Cited

U.S. PATENT DOCUMENTS 4,075,678 A * 2/1978 Levinn .................. H02H 5/047 361/104
6,052,268 A * 4/2000 Thomas ............... H03K 17/082 361/103
(Continued)

FOREIGN PATENT DOCUMENTS

DE 40 23 237 A1 10/1991
DE 40 33 444 A1 4/1992
(Continued)

OTHER PUBLICATIONS

International Search Report (PCT/ISA/210) issued in PCT Application No. PCT/EP2022/081480 dated Feb. 15, 2023 with English translation (5 pages).
(Continued)

*Primary Examiner* — Dharti H Patel
(74) *Attorney, Agent, or Firm* — Crowell & Moring LLP

(57) ABSTRACT

Systems, methods, and apparatuses are provided for actuating an isolating switch of a fuse. A vehicle may include a fuse comprising a supply input, a component output between which an electronic isolating switch and a fusible conductor are arranged electrically in series, and a measuring device for measuring an electrical property on the fuse. A fuse system may include a trip logic communicatively coupled via signaling technology to the measuring device and the electronic isolating switch, which is configured to evaluate measurement values determined via the measuring device, and actuate the electronic isolating switch based on a result of the evaluation.

13 Claims, 2 Drawing Sheets

(51) Int. Cl.
*H02H 3/05* (2006.01)
*H02H 3/08* (2006.01)
*H02H 3/20* (2006.01)

(52) U.S. Cl.
CPC .............. *H02H 3/08* (2013.01); *H02H 3/207* (2013.01); *H01H 2085/0266* (2013.01); *H01H 2085/0283* (2013.01)

(58) Field of Classification Search
CPC H02H 3/05; H02H 3/08; H02H 3/207; H02H 5/041; H02H 11/002
See application file for complete search history.

(56) References Cited

U.S. PATENT DOCUMENTS

| | | | | |
|---|---|---|---|---|
| 6,492,747 | B1 * | 12/2002 | Hoffmann | H01H 9/106 337/5 |
| 6,870,720 | B2 * | 3/2005 | Iwata | H02H 1/0015 361/87 |
| 6,992,463 | B2 * | 1/2006 | Yoshio | B60L 3/0046 320/136 |
| 8,203,312 | B2 * | 6/2012 | Yoshikawa | H01M 50/204 320/155 |
| 9,194,904 | B2 * | 11/2015 | Wang | G01R 31/52 |
| 11,373,815 | B2 * | 6/2022 | Askan | H02H 3/023 |
| 11,728,118 | B2 * | 8/2023 | Zhou | H01H 85/0095 361/837 |
| 2006/0120000 | A1 * | 6/2006 | Fiesoli | H02H 3/087 361/93.1 |
| 2007/0103834 | A1 * | 5/2007 | Huang | H02H 3/087 361/104 |
| 2009/0021874 | A1 * | 1/2009 | Divito | H02H 3/023 361/57 |
| 2009/0109590 | A1 * | 4/2009 | Girot | H03K 17/0822 361/93.1 |
| 2009/0251838 | A1 * | 10/2009 | Rousset | H02H 9/041 361/100 |
| 2009/0262473 | A1 * | 10/2009 | Weinert | H02H 9/008 361/56 |
| 2011/0026177 | A1 * | 2/2011 | Atluri | G11C 29/027 361/56 |
| 2011/0141643 | A1 * | 6/2011 | Hummel | H02H 3/08 361/93.1 |
| 2011/0170223 | A1 * | 7/2011 | DiMarco | H02H 3/08 361/94 |
| 2012/0099236 | A1 * | 4/2012 | Cyuzawa | H02J 1/06 361/101 |
| 2013/0163134 | A1 * | 6/2013 | Ji | H01M 10/42 361/86 |
| 2013/0222951 | A1 * | 8/2013 | Zhu | H02H 7/122 361/18 |
| 2014/0177121 | A1 * | 6/2014 | Ueno | H02H 5/04 361/104 |
| 2015/0077891 | A1 * | 3/2015 | Edwards | G01R 31/66 361/84 |
| 2016/0072269 | A1 * | 3/2016 | Esschendal | H02H 7/268 361/62 |
| 2018/0069411 | A1 | 3/2018 | Kim | |
| 2020/0051768 | A1 | 2/2020 | Moebis et al. | |
| 2020/0203945 | A1 | 6/2020 | Winkler et al. | |

FOREIGN PATENT DOCUMENTS

| | | | | |
|---|---|---|---|---|
| DE | 10 2017 111 652 | A1 | 11/2018 | |
| DE | 10 2018 215 352 | A1 | 3/2020 | |
| EP | 3 723 217 | A1 | 10/2020 | |
| WO | WO-2013064623 | A1 * | 5/2013 | H02H 7/18 |

OTHER PUBLICATIONS

German-language Written Opinion (PCT/ISA/237) issued in PCT Application No. PCT/EP2022/081480 dated Feb. 15, 2023 with English translation (7 pages).
German-language Search Report issued in German Application No. 10 2021 132 463.7 dated Jul. 5, 2022 with partial English translation (12 pages).

* cited by examiner

Prior Art

FUSE COMPONENT WITH ELECTRONIC CIRCUIT BREAKER AND FUSE WIRE

BACKGROUND AND SUMMARY

The present subject matter relates to a fuse component, comprising a supply input and a component output, between which an electronic isolating switch is arranged, and at least one measuring device for measuring an electrical property on the fuse component. The present subject matter also relates to a fuse system, comprising at least one fuse component of this type and a trip logic unit which is connected in terms of signal technology to the at least one measuring device and the electronic isolating switch and which is set up to evaluate measurement values determined via the at least one measuring device and to actuate the isolating switch based on the result of the evaluation. The present subject matter furthermore relates to a vehicle, comprising at least one fuse component of this type and/or at least one fuse system of this type. The present subject matter additionally relates to a method for actuating an isolating switch of a fuse component of this type. The present subject matter is in particular advantageously applicable to partly or fully autonomously driving vehicles.

In order to prevent system or component failures in a vehicle due to undervoltages and to achieve protection against thermal events such as electric arcs etc., components of the vehicle such as at least one electrical consumer, at least one electrical energy source (for example a battery, a supercapacitor, or a converter), at least one power distributor, etc., are sometimes protected via electronic fuses (also referred to as "eFuses" or "smart fuses"). As shown in FIG. 2, a conventional electronic fuse 101 comprises an electronic isolating switch 102 (for example a bipolar transistor, a MOSFET, etc.) which is installed in series between a supply input 103 and a component output 104. The component output 104 is provided, in particular, to be electrically connected to the at least one vehicle component that is to be protected.

At least one voltage measuring device (for example 105) is also located in the current path between the supply input 103 and the component output 104. The voltage measuring device(s) is/are connected to ground GND. A current measuring device 106 for measuring the electric current conducted through the current path is also located in the current path between the supply input 103 and the component output 104. The current in the current path in this case corresponds to the current through the electronic fuse 101. The voltage measuring device 105 and the current measuring device 106 are connected in terms of data technology to a trip logic unit 107 which can also switch the isolating switch 102 on or off selectively through appropriate actuation. The trip logic unit 107 can identify voltage drops at the voltage measuring device 105 and current drops at the current measuring device 106 and subsequently switch off or open the isolating switch 102 through appropriate actuation. In particular, the trip logic unit 107 can differentiate between various fault cases such as a short circuit, a creeping short circuit, incorrect polarity, undervoltage, etc. Since the isolating switch 102 is also set up, due to its design as an electric switch, to be switched on or off, or open or closed, selectively in a reversible manner as commanded, the isolating switch 102 can be actuated in a targeted manner with identification of a current or future fault by way of the trip logic unit.

As against the advantages of the electronic fuse 101, there is the fact that it is an electronic component and thus subject to a higher probability of failure or fault than a safety fuse.

Possible faults can arise, for example, in the measurement process (too high, too low, measurement failure, etc.), in the isolating element/switch (random or faulty opening, closing, etc.) or the trip logic unit. In such a case, in particular in the case of short circuits, impermissible currents and/or heating in the current path of the component(s), the rest of the on-board system is not protected and the overall system safety (for example including the availability of functions, functional safety and passenger safety) is jeopardized.

It is the object of the present subject matter to at least partly overcome the disadvantages of the prior art and, in particular, to improve the protection of electrical components that are protected by electronic fuses and superordinate systems, in particular in an on-board supply system of a vehicle, in a cost-effective manner.

It is the object of the present subject matter to at least partly overcome the disadvantages of prior art and, in particular, to provide an inexpensive way to improve the reliable protection of electrical components, in particular of a vehicle, by way of an electronic fuse.

This object is achieved according to the features of the independent claims. Preferred embodiments can be found, in particular, in the dependent claims.

The object is achieved by way of a fuse component, comprising a supply input and a component output, between which an electronic switch ("isolating switch") and a fusible conductor are arranged electrically in series, and comprising at least one measuring device for measuring an electrical property.

Said fuse component has the advantage that the combination of electronic isolating switch and mechanical fusible conductor provide protection on the basis of different types of trip mechanism (electrical and thermal, and material-mechanical, respectively), which combines the advantages of both types of trip mechanism. The series circuit composed of the electronic isolating switch and the fusible conductor corresponds in terms of function to a series circuit composed of the electronic fuse and the safety fuse. When said fuse component is used, all of the advantages of an electronic fuse can be used while the current path and the protected electrical components, due to the fusible conductor, continue to be secured against critical short-circuit currents via the electronic isolating switch even in the event of a fault. This increased reliability also results in the advantage that it is possible to dispense with a more expensive arrangement for increasing the reliability in the form of a series circuit composed of second electronic fuses, which would otherwise have to be used in the absence of diagnosis or monitoring. Arranging the isolating switch and the fusible conductor in a common component provides a particularly robust and inexpensive functional design.

The fuse component is, in particular, a component that has the function of protecting at least one electrical functional component connected thereto, in particular downstream thereof in the normal current direction. The fact that the fuse component is a component includes, in particular, the fact that it is an object that cannot be separated (without being destroyed). In particular, the component can have a housing that surrounds the electronic isolating switch and the at least one measuring device. In particular, the electronic isolating switch can be formed on a semiconductor substrate, in particular a silicon substrate (chip). In one development, at least one measuring device can also be formed on the semiconductor substrate. The semiconductor component can be embedded in the housing, in particular such that only electrical connections such as the supply input, the component output, etc. are led out. The housing may be an injection-molded part, for example.

The fuse component has two electrical connections for inserting the fuse component into a current line, which connections are referred to as “supply input” and “component output”, without restricting the generality. In particular, the fuse component can be designed to conduct current with particularly low losses or practically no losses when current flows from the supply input to the component output. One development is that the fuse component is provided as a high-side component, in which the at least one electrical component to be protected is connected in the voltage or current direction to the component output (“downstream” of the fuse component).

In particular, there is no current path between the supply input and the component output past the isolating switch and/or the fusible conductor.

The isolating switch is provided to use suitable circuitry or actuation to interrupt a current path in which it is used. The fact that the isolating switch is an electronic isolating switch includes, in particular, the fact that it has at least one semiconductor switch, for example a MOSFET. The isolating switch is therefore reversible, that is to say it can be actuated to block and/or conduct selectively (a transistor for example by applying an appropriate forward voltage to the control terminal), wherein the switching state thereof is often able to be changed as desired.

A measuring device for measuring an electrical property is understood as meaning, in particular, a device for quantitatively measuring at least one electrical property such as current, voltage, etc., which outputs as the result of the measurement a value—in particular an electrical property of the current path between the supply input and the component output (for example x amperes, y volts, etc.).

One development is that the fuse component is set up to actuate the electronic isolating switch in a manner dependent on temperature, for example to switch it off when a predefined threshold value temperature or a temperature gradient is reached or exceeded. One development is that the fuse component has at least one temperature measuring device which is set up, in particular, to quantitatively measure a temperature and to output a temperature value, for example in Kelvin or ° C., as the result of the measurement. The sensed temperature may be, for example, a temperature at the location or in the vicinity of the isolating switch, an ambient temperature, etc.

One configuration is that the electronic isolating switch is arranged upstream of the fusible conductor in the direction from the supply input to the component output. The supply input, the electronic isolating switch, the fusible conductor and the component output are thus interconnected in this order. This results in the advantage that it is particularly easy to implement reliable switching of the electronic isolating switch.

One configuration is that the electronic isolating switch is arranged downstream of the fusible conductor in the direction from the supply input to the component output. The supply input, the fusible conductor, the electronic isolating switch and the component outputs are thus interconnected in this order. This results in the advantage that the fusible conductor and the trip state thereof can be monitored particularly easily.

One configuration is that the at least one measuring device for measuring an electrical property comprises at least one voltage measuring device for determining a voltage at a point in a current path between the supply input and the component output. The electrical property is thus the voltage. This achieves the advantage, for example, that a voltage drop or undervoltage that is dangerous for a component that is to be protected can be identified quickly and then it is possible to react thereto by switching off the isolating switch. The at least one voltage measuring device can also be used—depending on the arrangement—to check a functionality of the electronic isolating switch and/or the fusible conductor or to diagnose a fault in these elements. If a voltage measuring device is arranged between the electronic isolating switch and the fusible conductor, for example, is it possible to easily determine whether the isolating element (isolating switch or fusible conductor) arranged upstream of the voltage measuring device with respect to the voltage source represents the correct target state (isolates/blocks, correctly or incorrectly, or inadvertently, tripped, etc.). If the isolating element is the fusible conductor and a measured voltage is zero, this may be an indication of a severed fusible conductor or an erroneous measurement—in the case of a closed state of the isolating switch. If the isolating element is the electronic isolating switch and this is actuated so as to be conducting, a measured voltage is zero, which may be an indication of a faulty isolating switch or an erroneous measurement.

One configuration is that the at least one measuring device comprises at least two voltage measuring devices, between which the electronic isolating switch and/or the fusible conductor is/are arranged. This achieves the advantage that the voltages upstream and downstream of the electronic isolating switch and/or the fusible conductor are able to be measured and, as a result, faults and failures thereof can be diagnosed particularly easily. Another advantage is achieved in that the voltage measurements are of redundant design, as a result of which an inaccurate or faulty voltage measuring device can be identified in turn. For example, ascertained, in particular measured, voltage peaks and/or voltage profiles can be compared with one another in the context of measurement validation and, for example, can be evaluated for the presence of a drift or a measurement inconsistency.

Overall, the at least one voltage measuring device can comprise, for example, the following arrangements in the stated order:

(a1) supply input—voltage measuring device—first isolating element (isolating switch or fusible conductor)—second isolating element (fusible conductor or isolating switch)—component output;

(a2) supply input—first isolating element—voltage measuring device—second isolating element—component output;

(a3) supply input—first isolating element—second isolating element—voltage measuring device—component output;

(b1) supply input—first voltage measuring device—first isolating element—second voltage measuring device—second isolating element—component output;

(b2) supply input—first isolating element—first voltage measuring device—second isolating element—second voltage measuring device—component output;

(b3) supply input—first voltage measuring device—first isolating element—second isolating element—second voltage measuring device—component output;

(c) supply input—first voltage measuring device—first isolating element—second voltage measuring device—second isolating element—third voltage measuring device—component output.

One development is that the at least two voltage measuring devices are connected to ground or to a reference potential separately or independently from one another, for example are connected to a body or ground lead of a vehicle. This achieves the advantage that, in contrast to a connection to ground via a common node, it is possible to identify a measurement deviation of one of the voltage measuring devices due to faulty or unreliable contact with ground. In this case, a voltage offset of the different connection points is typically negligible, for example in the case of connection to a body caused by the short distance and the low body resistance.

One configuration is that the at least one measuring device comprises at least one current measuring device for respectively determining a current intensity of an electric current in the current path between the supply input and the component output. This results in the advantage that current drops can be identified easily and quickly and also the quantitatively determined, in particular measured, current intensities can be used for other purposes, for example by an energy management system. Furthermore, the determined current intensities can be used for correlation with voltage values measured by one or two voltage measuring devices, for example for the purpose of validating or checking the plausibility of measurements.

The object is also achieved by way of a fuse system, comprising at least one fuse component as described above and a trip logic unit which is connected in terms of signal technology to the at least one measuring device and the electronic isolating switch and which is set up to evaluate measurement values determined via the at least one measuring device and to actuate the isolating switch based on the result of the evaluation. The fuse system may be designed analogously to the fuse component, and vice versa, and has the same advantages.

A trip logic unit can be understood, in particular, as a data processing device which evaluates measurement values determined or ascertained via the measuring device(s) and decides on the switching state (on/off or open/close) of the isolating switch based on the result of the evaluation and actuates the isolating switch in order to assume the desired switching state. As a result of the fact that the trip logic unit is connected in terms of signal technology to the at least one measuring device and the electronic isolating switch, it can receive measurement values from the at least one measuring device in analog or digital form and output actuation signals to the electronic fuse component or the isolating switch integrated therein, for example can set suitable actuation voltages for the control terminal of the isolating switch, as a result of which the isolating switch is switched (that is to say retains its previous switching state or changes its switching state depending on the actuation voltage that is applied).

The trip logic unit may be a data processing device which is set up to carry out its function by way of appropriate software. However, the logic unit may also be present in hardware or as wired circuitry. The trip logic unit may be implemented by software and stored in memory or non-transitory computer-readable medium. The software modules, which include computer instructions or computers code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

One development is that the trip logic unit is a component part, in particular a vehicle component part, which is different from the fuse component, that is to say is an entity "external to the fuse component". This entity may be an independent component part or may be integrated functionally into a component part used for other purposes, such as an energy management system, an on-board computer, etc.

One development is that the trip logic unit that is external to the fuse component is connected to a plurality of fuse components. It can then advantageously monitor and actuate a plurality of fuse components at the same time.

One development is that the trip logic unit is integrated into the fuse component. This achieves the advantage of autonomous monitoring and tripping. In this development, the fuse system corresponds to the fuse component. In particular, in this case too, the trip logic unit may be designed in hardware technology.

One configuration is that the trip logic unit is set up to switch the electronic isolating switch off before a melting integral that trips the fusible conductor is reached. This achieves the advantage that it is possible to prevent the fusible conductor from melting through, which would require replacing the fuse element, as long as the electronic isolating switch is isolating without fault. In this case, the isolating switch is thus used as an overcurrent protection device which protects the electrical component parts connected to the fuse element but also the fusible conductor. Only when the electronic isolating switch is no longer isolating without fault can the fusible conductor be tripped and severed when the melting integral thereof is reached. The switching state of the electronic isolating switch is fundamentally resettable.

One development is that the trip logic unit is connected in terms of signal technology to a current measuring device of the fuse element and therefore receives the values of the electric current flowing through the fuse element determined, in particular measured, via the current measuring device. The trip logic unit can take these current measurement values as a basis for calculating the melting integral (also known as the limit load integral or as the i2t value) in a fundamentally known manner, for example for a time window [t; t+Δt] according to the formula $$\int_{t}^{t+\Delta t} i^2 dt,$$

wherein i represents the electric current flowing.

One configuration is that the trip logic unit is set up to ascertain a state of health of the electronic isolating switch and/or the fusible conductor via the voltage values, in particular voltage differences, determined by a plurality of voltage measuring devices of the fuse element. The correlation of the voltage measurement values of different voltage measuring devices can advantageously be used to identify in a particularly reliable manner faulty component parts of the component and possibly even to predict a fault state, and it is possible to react to such events in a particularly operationally reliable and intelligent manner.

The state of health of the electronic isolating switch and/or the fusible conductor can also be ascertained by correlating the current measurement values of a plurality of current measuring devices and/or by correlating measurement values of measuring devices for different physical properties (for example voltage, current, temperature, etc.).

One configuration of a fuse system having a plurality of measuring devices for measuring the electrical property in a fuse component, wherein the trip logic unit is set up to ascertain a state of health of at least one of the measuring devices via the values of the electrical property respectively measured by the measuring devices, for example drifting, a measurement inconsistency, etc. in one of the measuring devices.

If the state of health of the isolating switch, the fusible conductor and/or the at least one measuring device is no longer sufficient for reliably maintaining the fuse protection or if a possible failure or fault is predicted, at least one action can be triggered, for example a notification can be output to the driver of a vehicle, to a service point (such as a workshop) and/or to a manufacturer of the vehicle, a note can be saved in a fault memory, the at least one electrical component part with fuse protection can be deactivated fully or in relation to some of the functions thereof, etc.

The object is also achieved by way of a vehicle which comprises at least one fuse component and/or at least one fuse system as described above. The vehicle can be designed analogously to the fuse component and/or the fuse system, and vice versa, and has the same advantages.

At least one fuse component and/or at least one fuse system may be part(s) of an on-board energy supply system of the vehicle.

The vehicle may be a vehicle with an internal combustion engine, a hybrid vehicle, or a fully electrically driven vehicle.

The vehicle may be a land-based vehicle (such as a passenger vehicle, truck, motorcycle, bus, etc.), a watercraft, a space vehicle (such as a Mars rover or a rocket) or an aircraft (such as an airplane, helicopter, etc.).

The vehicle is, in particular, a partly or fully autonomously driving vehicle, for which the fuse component and the fuse system can be particularly useful on account of the increased significance of the reliability of electrical component parts.

One configuration is that at least one fuse component is integrated into an electrical vehicle component part such as, for example, a consumer, a control apparatus, an electrical energy source, a current distributor, etc.

The object is also achieved by way of a method for actuating an isolating switch of a fuse component which comprises a supply input and a component output, between which an electronic isolating switch and a fusible conductor are arranged electrically in series, and at least one measuring device for measuring an electrical property on the fuse component, wherein measurement values determined via the at least one measuring device are evaluated and the isolating switch is switched on or off selectively based on the result of the evaluation. The method can be designed analogously to the vehicle, the fuse component and/or the fuse system, and vice versa, and has the same advantages.

The above-described properties, features and advantages of this present subject matter and the way in which these are achieved will become clearer and more clearly comprehensible in connection with the following schematic description of one example, which is explained in more detail in connection with the drawings.

DETAILED DESCRIPTION OF THE DRAWINGS

Figure 1:
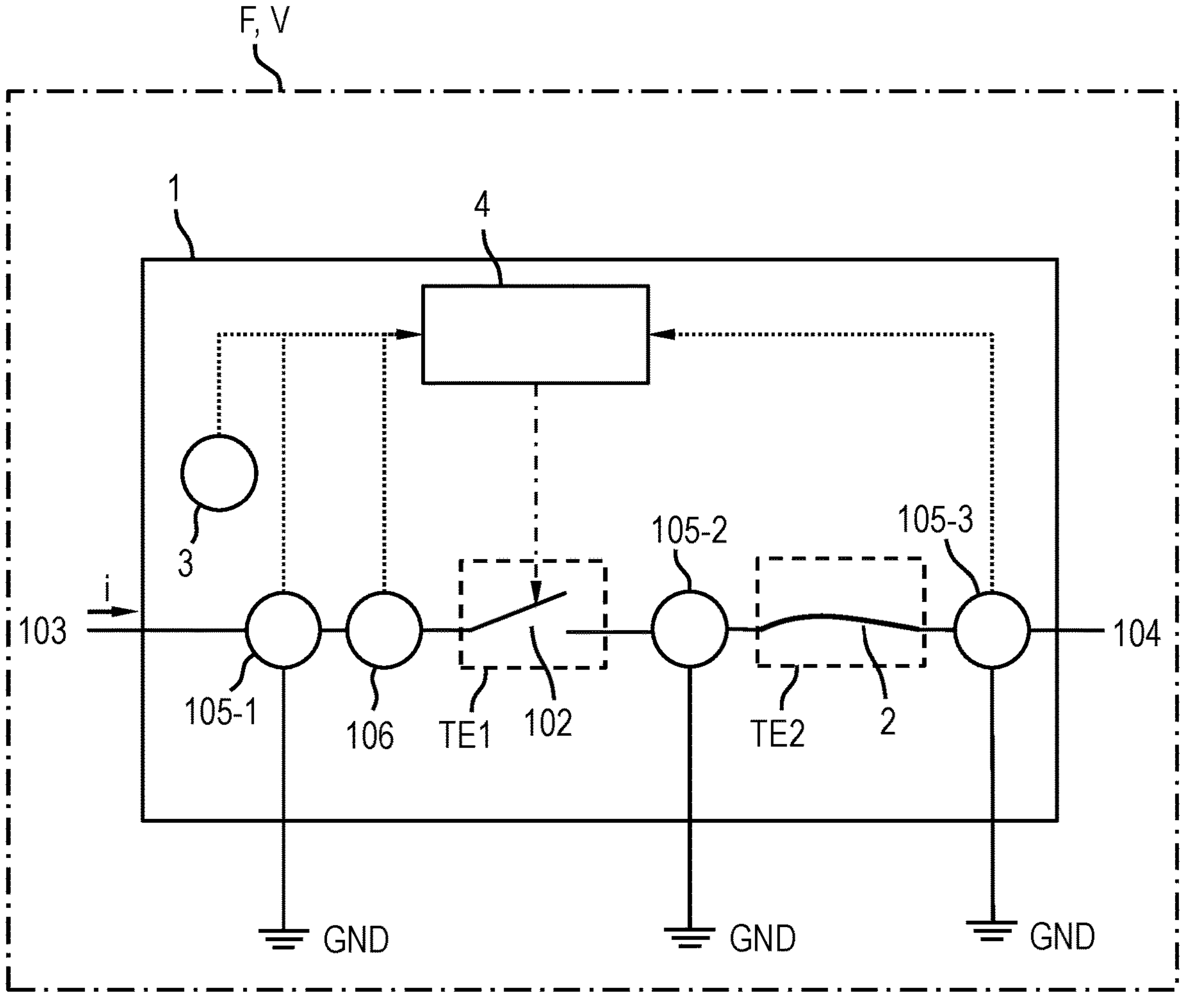
FIG. 1 shows a drawing of a fuse component according to a first example.
Figure 2:
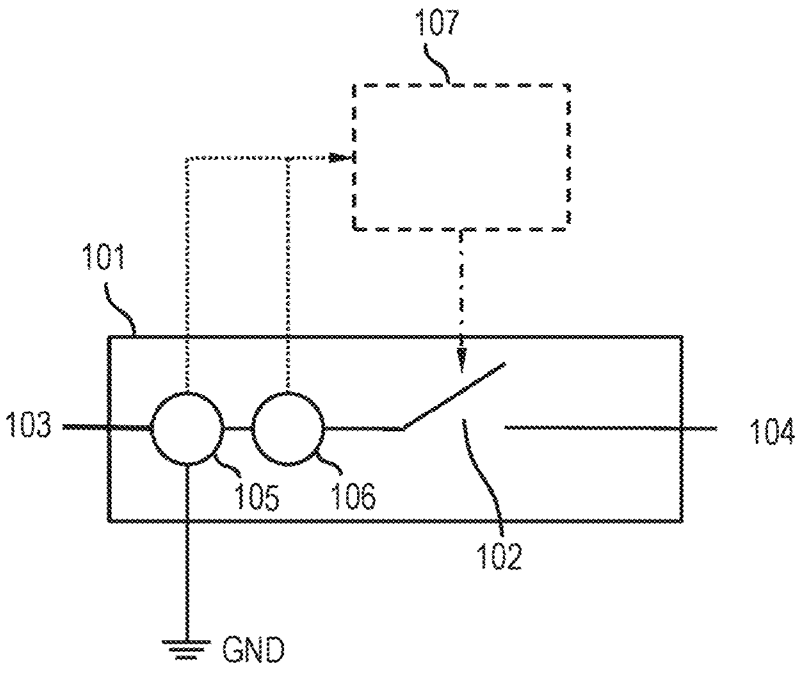
FIG. 2 shows a drawing of a conventional electronic fuse.

FIG. 1 shows a drawing of a fuse component 1 having a supply input 103 and a component output 104, between which a first isolating element TE1 in the form of an electronic isolating switch 102 and a second isolating element TE2 in the form of a fusible conductor 2 are arranged electrically in series, and at least one measuring device 105-1, 105-2, 105-3, 106, 3 for measuring an electrical property, specifically in this case by way of example

- at least one voltage measuring device 105-1, 105-2 and/or 105-3,
- a current measuring device 106 and
- a temperature measuring device 3.

The variant in which the electronic isolating switch 102 is arranged upstream of the fusible conductor 2 in the direction from the supply input 103 to the component output 104 is shown. However, this order may also be reversed, wherein then the first isolating element TE1 is present as the fusible conductor 2 and the second isolating element TE2 comprises the electronic isolating switch 102, which is then arranged downstream of the fusible conductor 2.

The measuring devices 105-1, 105-2, 105-3, 106, 3 are connected in terms of signal technology to a trip logic unit 4 which is integrated into the fuse component 1. The trip logic unit 4 can actuate the isolating switch 102 (for example a MOSFET) to be on or off selectively based on the measurement values received from the measuring devices 105-1, 105-2, 105-3, 106, 3. As an alternative, the trip logic unit 4 could also be arranged outside of the fuse component 1 and thus be an entity external to the fuse component.

The at least one voltage measuring device is arranged in a current path between the supply input 103 and the component output 104 in order to determine a voltage at a point in the current path. If there are a plurality of voltage measuring devices 105-1, 105-2 and/or 105-3 present, they are advantageously connected to ground GND separately.

The current measuring device 106 is set up to respectively determine a current intensity of an electric current in the current path between the supply input 103 and the component output 104 and in this case, for example, is arranged upstream of the first isolating element TE1.

The trip logic unit 4 can use the current measuring device 106, in particular, to measure the electric current i flowing between the supply input 103 and the component output 104 and to calculate the melting integral $$\text{Int} = \int_{t}^{t+\Delta t} i^2 dt,$$

therefrom. If the fusible conductor 2 is designed such that it melts or separates at a melting integral of Int_1, the trip logic unit 4 is advantageously set up to switch off the electronic isolating switch 102 before the calculated melting integral Int reaches the value Int_1 that trips the fusible conductor 2. This can be implemented, for example, so that the trip logic unit 4 switches off or opens the electronic isolating switch 102 when Int≥Int_2 where Int_2 is a predetermined threshold value, wherein furthermore Int_2<Int_1 holds true. As a result, the isolating switch 102 is used as a reversible overcurrent protection device for the fusible conductor 2.

The trip logic unit 4 is set up, in particular, to ascertain a state of health of the electronic isolating switch 102 and/or the fusible conductor 2 via the voltage values determined by the at least one voltage measuring device 105-1, 105-2 and/or 105-3. The state of health of the fusible conductor 2 may include, for example, the difference between conducting/nonconducting.

The trip logic unit 4 is set up, in particular, to ascertain a state of health of at least one of the measuring devices 105-1, 105-2, 105-3, 106, 3 via the measurement values respectively determined by a plurality of measuring devices 105-1, 105-2, 105-3, 106, 3, for example by way of measurement validation.

The fuse component 1 may be part of an on-board supply system V of a vehicle F, in particular a partly or fully autonomously driving electric vehicle.

By way of example, at least one vehicle component part to be protected (top of figure) such as a consumer (for example a brake system, a steering system, etc.) can be connected to the component output 104. In one possible variant, if the vehicle is started, the electronic isolating switch 102 first checks the function of the isolating switch 102 and the fusible conductor. This can be done in a variety of ways, like for some example options in which the first isolating element TE1 comprises the electronic isolating switch 102 and the second isolating element TE2 comprises the fusible conductor 2, now explained more specifically for the above arrangements:

(a2) supply input 103—isolating switch 102—voltage measuring device 105-2—fusible conductor 2—component output 104;

(b1) supply input 103—first voltage measuring device 105-1—isolating switch 102—second voltage measuring device 105-2—fusible conductor 2—component output 104; and (c) supply input 103—first voltage measuring device 105-1—isolating switch 102—second voltage measuring device 105-2—fusible conductor 2—third voltage measuring device 105-2—component output 104. It is assumed here that a voltage U>0 is applied to the supply input.

In arrangement (a2), the trip logic unit 4 can open the isolating switch 102, for example. If no voltage (U=0) is applied to the voltage measuring device 105-2, the isolating switch 102 opens correctly. However, if the voltage U>0 is applied to the voltage measuring device 105-2, the isolating switch 102 opens incorrectly. The trip logic unit 4 can also close the isolating switch 102. If the voltage U>0 is applied to the voltage measuring device 105-2, the isolating switch 102 closes correctly. However, if the voltage U=0 is applied to the voltage measuring device 105-2, the isolating switch 102 closes incorrectly. If the voltage U>0 is applied to the voltage measuring device 105-2 and no voltage is applied to the consumer connected downstream or if the consumer connected downstream does not receive an operating current (which can be identified separately), this is an indication of a severed fusible conductor 2.

In arrangement (b1), the first voltage measuring device 105-1 can additionally be used to determine whether a voltage U is actually applied to the supply input 103. If a voltage difference ΔU=U1−U2 between the voltage U1 measured by the voltage measuring device 105-1 and the voltage U2 measured by the voltage measuring device 105-2 when the isolating switch 102 is open is zero, this is an indication that the isolating switch 102 is opening incorrectly. If the voltage difference ΔU when the isolating switch 102 is closed is greater than zero, for example ΔU=U1 holds true, this is an indication that the isolating switch is closing incorrectly. Furthermore, the trip logic unit 4 can be used to monitor the voltages U1 and U2, in particular the time profiles thereof, in order to identify a faulty or inaccurate voltage measuring device 105-1, 105-2, for example in order to determine a drift.

In arrangement (c), the correct functionality of the isolating switch 102 and the fusible conductor 2 can be checked directly by measuring a voltage difference between the voltage measuring devices 105-1 and 105-2 or between the voltage measuring devices 105-2 and 105-3.

If the isolating switch 102 and/or the fusible conductor 2 are not in order and/or if one or more of the voltage measuring devices 105-1, 105-2, 105-3 are not sufficient enough or even faulty, a corresponding indication can be output and/or another action can be triggered by the vehicle F, for example.

If the isolating switch 102 and the fusible conductor 2 are in order, the protected at least one consumer can be supplied with power by closing the isolating switch 102. The power supply can be interrupted by the fuse component 1 during normal operation of the vehicle F, for example, when: an undervoltage is identified, after which the trip logic unit 4 opens the isolating switch 102, and/or when the melting integral reaches or exceeds the threshold value Int 2, after which the trip logic unit 4 opens the isolating switch 102. If the isolating switch 102 is faulty, without this having been identified, the power supply can be interrupted by the fusible conductor 2 during normal operation of the vehicle F, when the melting integral reaches the threshold value Int_1, the fusible conductor 2 melts through.

It goes without saying that the present subject matter is not restricted to the example shown.

The isolating switch 102 can thus additionally or alternatively be opened by the trip logic unit 4 when a current drop is determined via the current measuring device 106 and/or overheating is determined via the temperature measuring device.

LIST OF REFERENCE SIGNS

1 Fuse component
2 Fusible conductor
3 Temperature measuring device
4 Trip logic unit
Electronic fuse
102 Electronic isolating switch
103 Supply input
104 Component output
105 Voltage measuring device
105-1 Voltage measuring device
105-2 Voltage measuring device
105-3 Voltage measuring device
106 Current measuring device
107 Trip logic unit
F Vehicle
GND Ground/reference potential
i Electric current intensity
TE1 First isolating element
TE2 Second isolating element
V On-board supply system

What is claimed is:

1. A fuse, comprising:

a supply input;

a component output between which an electronic isolating switch and a fusible conductor are arranged electrically in series; and a plurality of measuring devices for measuring an electrical property on the fuse;

wherein the plurality of measuring devices includes a first measuring device disposed between the supply input and the electronic isolating switch, a second measuring device disposed between the electronic isolating switch and the fusible conductor, and a third measuring device disposed between the fusible conductor and the component output.

2. The fuse according to claim 1, wherein the electronic isolating switch is arranged upstream of the fusible conductor in the direction from the supply input to the component output.

3. The fuse according to claim 1, wherein the electronic isolating switch is arranged downstream of the fusible conductor in the direction from the supply input to the component output.

4. The fuse according to claim 1, wherein each of the plurality of measuring devices comprises a voltage measuring device for determining a voltage at a point in a current path between the supply input and the component output.

5. The fuse according to claim 1, wherein each of the plurality of measuring devices comprises a current measuring device for respectively determining a current intensity of an electric current in the current path between the supply input and the component output.

6. A fuse system, comprising:

the fuse according to claim 1; and a trip logic communicatively coupled via signaling technology to the plurality of measuring devices; and the electronic isolating switch, which is configured to:

evaluate measurement values determined via the measuring device, and actuate the electronic isolating switch based on a result of the evaluation.

7. The fuse system according to claim 6, wherein the trip logic is integrated into the fuse.

8. The fuse system according to claim 6, wherein the trip logic is an entity external to the fuse.

9. The fuse system according to claim 6, wherein the trip logic is configured to switch the electronic isolating switch off before a melting integral that trips the fusible conductor is reached.

10. The fuse system according to claim 6, wherein the trip logic is configured to ascertain a state of health of the electronic isolating switch and/or the fusible conductor via voltage differences determined by the plurality of measuring devices.

11. The fuse system according to claim 6, wherein the trip logic is configured to ascertain a state of health of the plurality of measuring devices via the values of the electrical property respectively determined by the plurality of measuring devices.

12. A vehicle, comprising:

a fuse, comprising:

a supply input, a component output between which an electronic isolating switch and a fusible conductor are arranged electrically in series, and a plurality of measuring devices for measuring an electrical property on the fuse; and a fuse system, comprising:

a trip logic communicatively coupled via signaling technology to the plurality of measuring devices; and the electronic isolating switch, which is configured to:

evaluate measurement values determined via the plurality of measuring devices, and actuate the electronic isolating switch based on a result of the evaluation;

wherein the plurality of measuring devices includes a first measuring device disposed between the supply input and the electronic isolating switch, a second measuring device disposed between the electronic isolating switch and the fusible conductor, and a third measuring device disposed between the fusible conductor and the component output.

13. A method for actuating an isolating switch of a fuse having a supply input and a component output between which an electronic isolating switch and a fusible conductor are arranged electrically in series, and a plurality of measuring devices for measuring a property on the fuse, the method comprising:

determining measurement values via the plurality of measuring devices;

evaluating the determined measurement values; and switching the isolating switch on or off selectively based on a result of the evaluation;

wherein the plurality of measuring devices includes a first measuring device disposed between the supply input and the electronic isolating switch, a second measuring device disposed between the electronic isolating switch and the fusible conductor, and a third measuring device disposed between the fusible conductor and the component output.

* * * * *